United States Patent
Duvvuri

[15] 3,664,455
[45] May 23, 1972

[54] TWISTED VANE SOUND SUPPRESSOR FOR AIRCRAFT JET ENGINE

[72] Inventor: Tirumalesa Duvvuri, Chula Vista, Calif.
[73] Assignee: Rohr Corporation, Chula Vista, Calif.
[22] Filed: Mar. 15, 1971
[21] Appl. No.: 124,366

[52] U.S. Cl. ........................ 181/33 HC, 181/33 HD, 181/67,
 181/64, 239/265.17, 239/265.33
[51] Int. Cl. ..................... F01n 1/14, F01n 1/18, B64d 33/06
[58] Field of Search ............... 181/33 HB, 33 HC, 33 HD, 43,
 181/51, 66, 67, 64, 58; 239/265.11, 265.13, 265.17,
 127.3, 265.19, 265.33

[56] References Cited

UNITED STATES PATENTS

| | | | |
|---|---|---|---|
| 2,934,889 | 5/1960 | Poulos | 181/33 HC |
| 3,153,319 | 10/1964 | Young et al. | 181/33 HC |

FOREIGN PATENTS OR APPLICATIONS 885,093  12/1961  Great Britain ................... 181/33 HD

*Primary Examiner*—Robert S. Ward, Jr.
*Attorney*—George E. Pearson

[57] ABSTRACT

A plurality of vanes, each twisted about a longitudinal axis, and of airfoil sectional shape, are mounted peripherally about the exit end of a jet engine duct from which a jet exhaust stream is discharged. Control means adjust the vanes about their longitudinal axis from stowed position with their leading ends substantially tangent to the edge portion of the duct upon which they are mounted, to deployed position with their leading ends disposed substantially radially of such duct. In their stowed position the vanes cause minimum mixing of the jet stream gases with the surrounding ambient air, while in their deployed position the outer portions of the vanes project into the surrounding ambient air, and their inner portions project into the jet exhaust stream to cause a substantial but smooth intermixing of such gases, thereby tending to reduce noise producing turbulence.

4 Claims, 8 Drawing Figures

PATENTED MAY 23 1972 3,664,455

INVENTOR.
TIRUMALESA DUVVURI
BY
George Z. Nearon
ATTORNEY

TWISTED VANE SOUND SUPPRESSOR FOR AIRCRAFT JET ENGINE

BACKGROUND OF THE INVENTION

In the past many attempts have been made to reduce noise-generating turbulence caused by the violent shearing action which results from the discharge of a high velocity jet stream from a jet aircraft engine into the ambient atmosphere. Some of such well known prior attempts, such as the division of the jet stream into several smaller streams, increasing its circumference by means of fluted nozzles, and others, have resulted in sound reduction of varying degrees. However, such sound reduction frequently is at the price of reduced thrust during cruising, greater complexity, and increased cost.

SUMMARY OF THE INVENTION

A primary objective of the present invention is to induce smoother intermixing in the boundary layer between a high velocity jet exhaust stream from an aircraft jet engine and the ambient atmosphere by mounting a plurality of twisted vanes at the exit end of a duct from which the jet stream is discharged. The vanes preferably are of airfoil sectional shape, and are mounted with their respective axes substantially coextensive with the wall of the duct and directed lengthwise along the boundary of such jet stream. Control means are provided for rotatively adjusting the vanes about their respective axes between stowed position of minimum mixing effect and deployed position of maximum mixing effect.

BRIEF DESCRIPTION OF THE DRAWINGS

The foregoing objectives and advantages of the invention will be apparent from the following description and the accompanying drawings wherein.

DETAILED DESCRIPTION OF THE DRAWINGS

Figure 1:
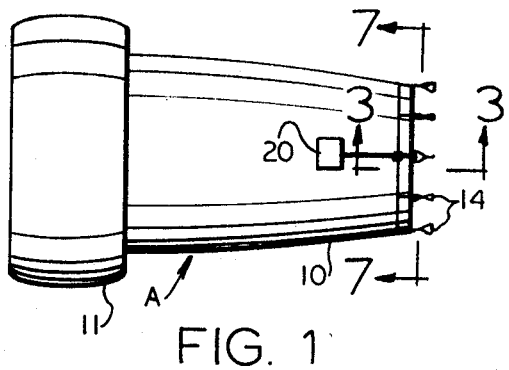
FIG. 1 is a diagrammatic, side elevational view of a short fan exhaust duct type aircraft jet engine with the invention embodied therein.

Referring to the drawings in detail, in FIG. 1 a short fan exhaust duct type aircraft jet engine A has a usual turbine exhaust discharge nozzle 10 through which the exhaust gases from the engine turbine are discharged, and a usual short fan exhaust shroud 11 from which fan air is discharged at a lower velocity than the turbine gas stream from the engine nozzle 10. The fan air forms an envelope surrounding the turbine jet stream.

Figure 2:
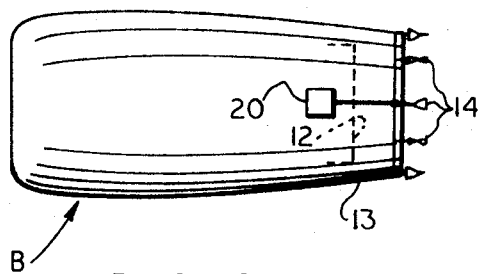
FIG. 2 is a similar view showing the invention embodied in a long fan exhaust duct type jet engine.

In FIG. 2 a long fan exhaust duct aircraft jet engine B has its turbine exhaust discharge nozzle 12 terminating upstream of a usual shroud 13, so that there is some mixing of the fan air and combustion gases prior to their discharge from the aft end of the shroud 13.

Regardless of the type of jet aircraft engine employed, in the present invention a plurality of twisted vanes 14 are mounted on the after end of an engine duct or nozzle from which is discharged a jet gas stream at a much higher velocity than the air or other gases surrounding such jet stream. The number, size, and amount of twist of the vanes 14 employed are matters of selection and design which are to be determined for each type of engine installation in which the invention is to be embodied.

The illustrative vanes 14 are twisted helically about their respective longitudinal axis, and are mounted co-axially on shaft portions 15 journaled for rotative movement in the aft end of the wall 17 of an exhaust duct, such as the nozzle 10 of FIG. 1, or the shroud 13 of FIG. 2, through which a jet exhaust gas stream is discharged. Each vane shaft 15 is of suitable metal rod, and preferably is recessed into the wall 17 so that its axis of rotation is at or near the mid-thickness of the wall.

Figure 3:
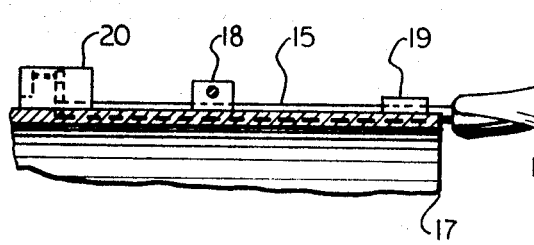
FIG. 3 is an enlarged, fragmentary, sectional view taken along line 3—3 of FIG. 1, the twisted vane being shown in its position of minimum mixing effectiveness.
Figure 4:
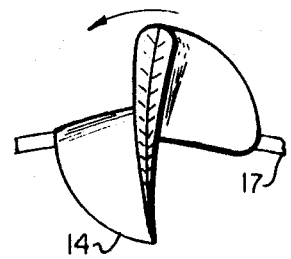
FIG. 4 is a rear end view of FIG. 3.
Figure 5:
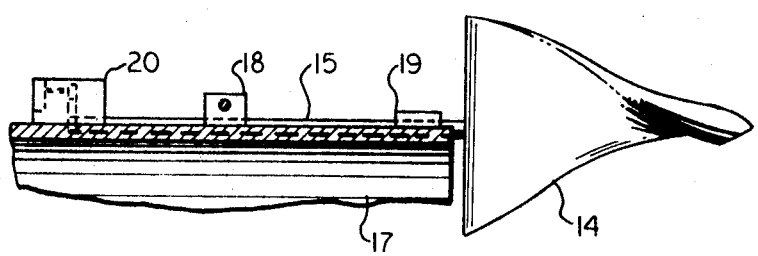
FIG. 5 is a view similar to FIG. 3, but showing the twisted vane rotated about its axis through an angle of 90° in the direction of the arrow of FIG. 4 to its position of maximum mixing effectiveness.
Figure 6:
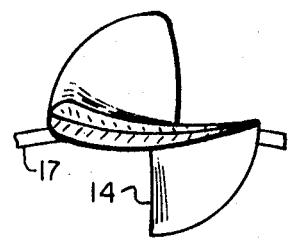
FIG. 6 is a rear end view of FIG. 5.

Bearings 18 and 19, see FIGS. 3 and 5, pivotally mount each vane shaft 15 for rotative adjustment about its axis, and synchronized control means 20 are constructed and arranged to move all of the vanes 14 simultaneously to rotatively adjusted position about their respective helical axes between their stowed position shown in FIGS. 3 and 4, and their deployed position shown in FIGS. 5 and 6. Since control mechanisms for such use are well known, and since such mechanism is not, per se, a feature of the invention, the details thereof are omitted.

Each vane 14 is of suitable material, such as for example, stainless steel or titanium, and is twisted through an angle of 90° about its longitudinal mid-line. It also may be stretched simultaneously as necessary and desired so that the lateral edges thereof define helical, or substantially helical curves around the twist axis. Each vane preferably is of airfoil sectional shape to provide for a smooth flow of the gases thereover, and to reduce separation of the gases. The manner of making the vanes is not, however, a feature of the invention, and a number of suitable ways of making them will be obvious to an aircraft engineer or designer in designing an installation for embodying the invention in a particular type of engine.

OPERATION

In using the invention, with a selected number of the vanes 14 mounted, as described previously herein, on individual, rotatively adjustable shafts 15 around the discharge end of a selected jet stream exit duct of an aircraft jet engine, which duct has a high speed exhaust gas jet stream exiting from the interior thereof, and a slower moving envelope of fan or atmospheric air flowing along its exterior, in preparing for takeoff or during landing approach, where maximum sound reduction is required, the vane control mechanism 20 is actuated to pivotally move the vanes 14 to their deployed position of FIGS. 2, 5 and 6.

Figure 7:
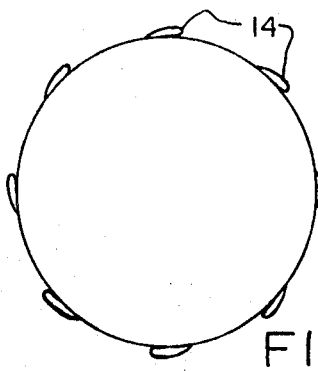
FIG. 7 is an enlarged, diagrammatic, sectional view taken along line 7—7 of FIG. 1.
Figure 8:
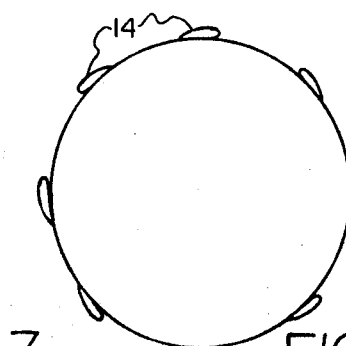
FIG. 8 is a view similar to FIG. 7, but showing alternate vanes of opposite helical pitch.

In this deployed position of the vanes, exhaust gases exiting from the duct upon which the vanes are mounted are swirled by the vanes outwardly into the surrounding envelope of ambient air or other gases, while gases from the envelope are similarly swirled inwardly into the exhaust gas jet stream. At the same time the gases thus intermixed are given a positive helical stream form which tends to reduce indiscriminate eddy currents with their well known noise creating characteristics. Insufficient test data is at present available to determine optimum number, size and shape of the vanes. Present plans are for the vanes to all have the same pitch direction as shown in FIG. 7. However, tests to be conducted later may indicate that it is preferable to have alternate vanes formed with opposite pitch direction as shown in FIG. 8.

The invention provides mechanism for smoothly intermixing portions of the boundary layer of gases between a jet exhaust stream and a surrounding envelope of air or other gases, which mechanism is simple, inexpensive, operates in either deployed or stowed mode with little loss of thrust, and can be readily provided as a retrofit kit.

Having thus described my invention, what I claim as new and useful and desire to secure by U. S. Letters Patent is:

1. Sound attenuating mechanism for an aircraft jet engine having an annular wall defining an exhaust duct through the exit end of which is discharged a jet stream of exhaust gases, said mechanism comprising:

a plurality of helically twisted vanes mounted in spaced relation peripherally about, and directly aft of, the exit end of said duct wall, thereby positioning said vanes in the boundary layer between the jet exhaust stream and surrounding gas envelope, means mounting each vane for rotative adjustment about its helical axis, such helical axis being disposed longitudinally of the duct, and vane actuating means operatively connected to move said vanes in unison, rotatively about their respective helical axes, between stowed position with the upstream edge of each vane substantially tangent to the duct wall, and deployed position with the upstream edge of each vane disposed substantially radially of such duct wall.

2. Sound attenuating mechanism as claimed in claim 1 wherein operation of the vane actuating means moves all of the vanes rotatively in the same direction.

3. Sound attenuating means as claimed in claim 1 wherein operation of the vane actuating means moves alternate ones of the vanes rotatively in opposite directions.

4. Sound attenuating means as claimed in claim 1 wherein the vanes are of airfoil shape in the direction of gas flow past the vanes.

* * * * *